FREQUENCY MODULATION DETECTOR

Original Filed Jan. 23, 1950

INVENTOR
D. W. Blancher
BY [signature]
ATTORNEY

United States Patent Office 2,761,969

Patented Sept. 4, 1956

2,761,969

FREQUENCY MODULATION DETECTOR

Donald W. Blancher, North Hollywood, Calif., assignor to Bendix Aviation Corporation, South Bend, Ind., a corporation of Delaware Original application January 23, 1950, Serial No. 140,128, now Patent No. 2,667,626, dated January 26, 1954. Divided and this application March 19, 1951, Serial No. 216,431

3 Claims. (Cl. 250—27)

This invention relates to electrical circuits for receiving and detecting frequency modulated waves. The present application is a division of my application Serial No. 140,128, filed January 23, 1950, now Patent No. 2,667,626, issued January 26, 1954, for a Telemetering System for Wells, and the detecting circuit herein disclosed is particularly adapted for although not limited to telemetering with frequency modulated waves.

An object of the invention is to provide an efficient and simple frequency modulation detector capable of handling low modulation frequencies with accuracy and unaffected by amplitude variations in the received wave.

Other more specific objects and features of the invention will appear from the description to follow, with reference to the drawing, in which.

Figure 1:
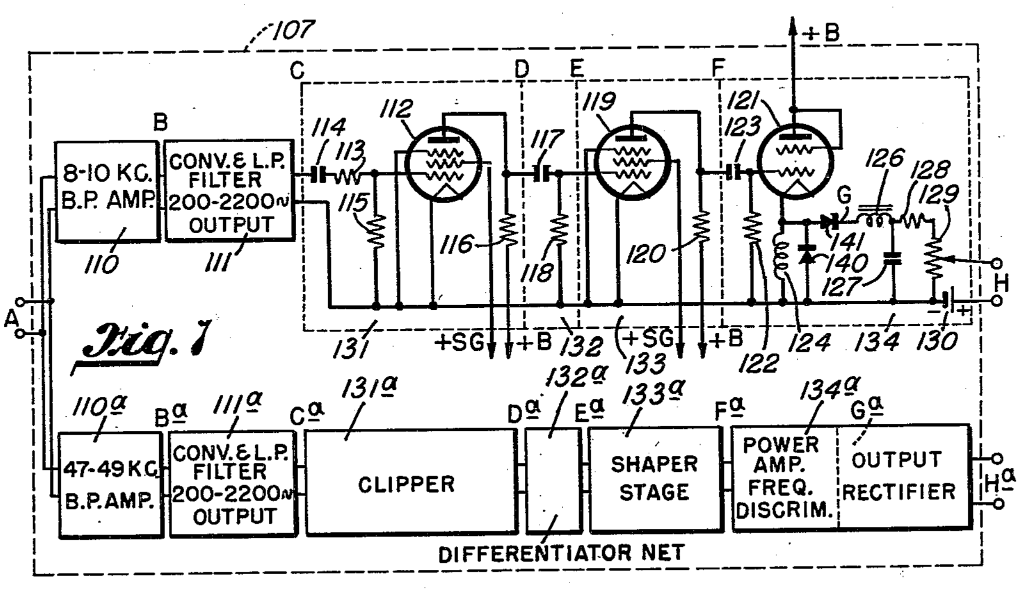
Fig. 1 is a schematic diagram of a receiving and detecting circuit incorporating the invention.

The circuit of Fig. 1 is intended to receive a composite signal consisting of two frequency modulated waves, one in the 8 to 10 kc. band, and the other in the 47 to 49 kc. band over a circuit connected to input terminals A.

Figure 2:
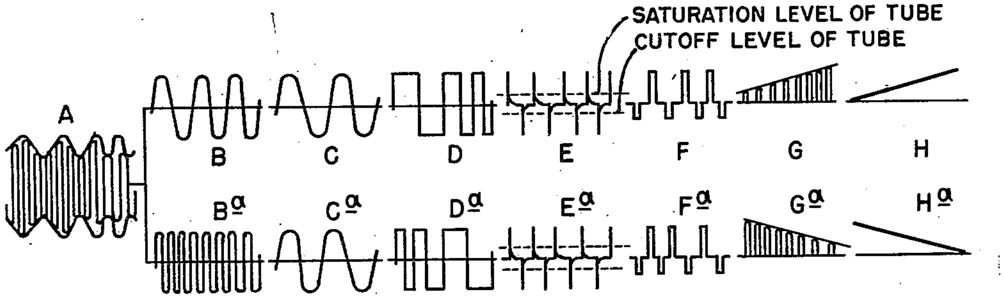
Fig. 2 is a set of curves illustrating the operation of the circuit of Fig. 1.

A graphical representation of the composite wave form is shown by curve A in Fig. 2. The composite wave A is applied to two band pass amplifiers 110 and 110*a*. The band pass amplifier 110 will pass only the low frequency component which may vary in frequency from 8 to 10 kc. The other band pass amplifier 110*a* will pass only the high frequency component that may vary in frequency from 47 to 49 kc. At points B and $B^a$ the resultant separated waves are shown in curves B and $B^a$. In practice the waves are approximately sinusoidal and the wave B is shown as increasing in frequency with time, whereas the wave $B^a$ is shown as decreasing in frequency with time. From amplifier 110, the varying frequency wave B is passed into a converter 111 whose local oscillator frequency is so chosen as to produce a 200 cycle per second beat note at the lowest frequency (8 kc.) to be used. The converter also contains a low pass filter to enable a frequency varying from 200 cycles per second to 2200 cycles per second to be passed with negligible attenuation. The wave at point C is approximately sinusoidal, varying in frequency from 200 to 2200 cycles per second, depending upon the frequency of the received signal, and is illustrated by curve C in Fig. 2 which is, along with the other curves, exaggerated to illustrate the point. Wave C is fed into a clipper 131 consisting of a condenser 114 in series with resistors 113 and 115 and a tube 112 the control grid of which is connected to the juncture of resistors 113 and 115. On positive excursions, the grid draws current, producing a voltage drop across resistor 113 that limits its potential and clips the positive half waves. On negative excursions, the grid potential is swung past the cut-off point of the tube, so that the wave at point D is substantially square topped, and of constant amplitude as illustrated by curve D in Fig. 2. The condenser 114 is of such size as to pass all frequencies within the band 200–2200 cycles with negligible distortion. A load resistor 116 in the anode circuit of the tube 112 is chosen relatively large to accentuate the clipping action.

The square-topped pulses of curve D vary in width inversely with the frequency. They are shaped into pulses of constant width independent of the frequency by differentiating the wave form of curve D in a differentiating network 132, and shaping it in a shaping amplifier stage 133.

The differentiating network 132 comprises a condenser 117 in series with a resistor 118, the junction of which is connected to the control grid of a vacuum tube 119 in the shaping amplifier stage 133. The time constant of the RC circuit consisting of the condenser 117 and the resistor 118 is small compared to the time duration of the shortest pulses (curve D) applied thereto. The potential developed at the juncture of the condenser 117 and the resistor 118 is represented by curve E of Fig. 2. It will be observed that this curve consists of a train of alternately positive and negative pips, the amplitude of which is large as compared to the positive and negative potentials required to drive the tube 119. Thus, as shown by the dotted lines in curve E, the positive pips drive the tube 119 well beyond saturation, thereby causing severe clipping in the plate circuit. The negative pips drive the tube 119 well beyond the cut-off level of the tube, resulting in severe clipping of the negative pips. The resultant wave in the output circuit of the tube 119 is shaped as shown in curve F which consists of a train of pulses of constant amplitude and constant width, regardless of variations in the frequency, the latter simply affecting the distance between successive pips. In curve F the positive pips are of greater magnitude than the negative pips because of the zero bias point selected for the grid of vacuum tube 119 to operate about. However, as will appear later, the relative magnitudes of the positive and negative pips is immaterial, only the positive pips producing an effect on the final current.

The anode load resistor 120 of tube 119 is of such size as to accentuate the steep sides of the pulses.

The output of the shaper amplifier stage 133 at point F is coupled to the input of a power-amplifying frequency discriminating and rectifying stage 134, which produces a direct current the amplitude of which varies with the frequency of recurrence of the positive pips in curve F. Stage 134 includes vacuum tube 121 having its anode connected directly to the B supply, and having an output inductance element 124 in its cathode circuit, so that it functions as a cathode follower. The control grid of the tube 121 is connected to the juncture of a series connected condenser 123 and resistor 122 to which the pips of curve F are applied from the preceding stage 133. The condenser 123 and resistor 122 are of such value as to provide grid leak bias of the grid of tube 121 by virtue of rectified grid current. The output inductance element 124 is shunted by a rectifier 140 so poled as to bypass negative impulses from the cathode of tube 121 past the inductance element 124. On the other hand, positive pulses applied from the cathode to the upper end of the inductance element 124 are conducted through a rectifier 141 to a filter consisting of a series inductance element 126, a shunt condenser 127, a series resistor 128, and a potentiometer 129. The movable contact of the potentiometer 129 is connected to one output terminal, and the lower end of the potentiometer 129 is connected by a biasing battery 130 to the other output terminal.

The action of stage 134 will be explained with reference to the diagram of Fig. 3 which shows a curve 143 representing the variation of cathode current in the tube 121 with variations in grid voltage, the latter being plotted horizontally, and the cathode current vertically. The pips of curve F are applied to the grid of the tube, and a train of such pips is shown as including positive pips 144 and 145 equally spaced apart, and pips 146, 147, 148, 149, 150, 151 and 152 spaced progressively closer together. Corresponding intervening negative pips are identified by the same reference numerals with the suffix "*a*."

As has been previously explained, all of the pips applied to the stage 134 are of equal magnitude, but differ only in their spacing. Each positive pip applied to the grid of tube 121 causes the latter to draw current and charge the condenser 123, thereby applying a negative bias to the grid. This negative bias gradually leaks off through the resistor 122, but so long as the positive pips applied to the tube are equally spaced apart, the average bias of the grid will remain constant. However, if the pips come at closer intervals, the negative bias on the grid will increase, and its value will be a measure of the frequency of recurrence of the pips. Thus, referring to Fig. 3, let it be assumed that the pips 144 and 145 are uniformly spaced apart the same as the preceding pips, and that this spacing was such as to produce a grid bias represented by the upper end portion of the dotted line 160. The positive pip 144 will drive the tube beyond saturation, and produce a current pip **144*b* in the cathode circuit of the tube 121. The succeeding negative pip 144*a* applied to the grid of the tube reduces the conductance of the tube and produces a negative current pip 144*c* in the cathode circuit. The positive and negative pips in the output circuit of the tube remain constant so long as successive pips applied to the input circuit are uniformly spaced. However, it will be noticed that the positive pip 146 in Fig. 3 follows the pip 145 more closely than the latter followed pip 144, this indicating an increase in frequency of the original wave. Because of the reduced lapse of time, less of the charge imposed on the condenser 123 can leak off between pulses, and the grid bias as represented by the dotted line 160 in Fig. 3 increases to a more negative value. The result is that the positive current pip 146*b* in the output circuit starts from a lower base and is therefore larger. The corresponding negative pips become shorter, but this is of no moment because the negative pips are blocked by the rectifier 141 and shorted across inductance 124 by rectifier 140** and do not appear in the final output.

Figure 3:
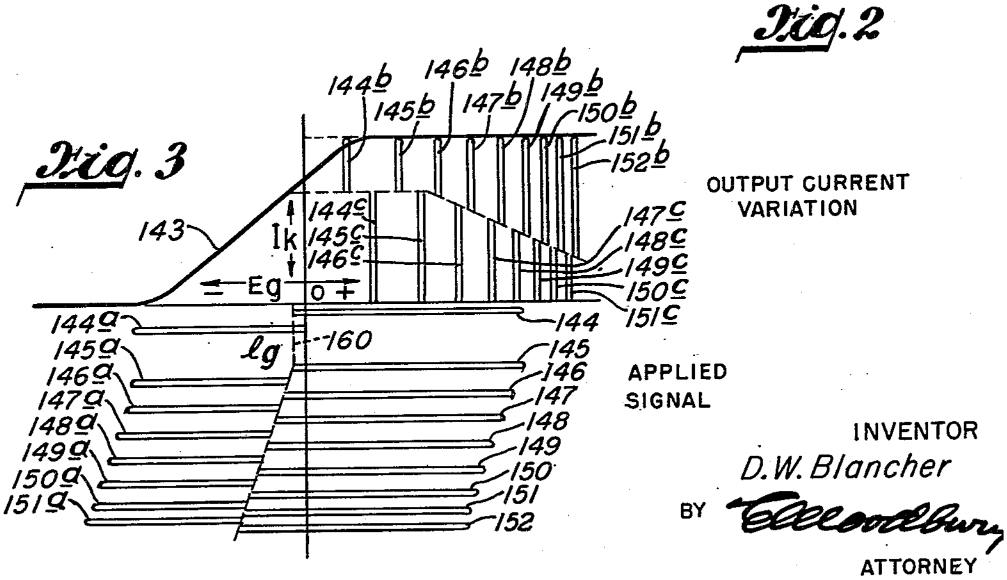
Fig. 3 is a graph illustrating the operation of the frequency discriminators in the circuit of Fig. 1.

In Fig. 3 the pips from 146 to 152 inclusive recur at increasingly more frequent intervals, so that the potential on the grid of tube 121 becomes progressively more negative, as shown by line 160, the output positive current pips become progressively larger, and the unused negative pips become progressively smaller.

Referring to curve G of Fig. 2 which shows the potential developed across the inductance element 124, it will be observed that the pulses (positive) developed across this inductance element is response to the positive pulses applied to the grid not only recur at shorter intervals with increasing frequency, but are also of increasing magnitude. When integrated by the filter, consisting of the elements 126, 127 and 128, they become a direct current of increasing magnitude as shown in curve H.

The circuit associated with the tube 121 has several unique characteristics. In the first place, whereas it is customary to employ a resistor as the output impedance element of a cathode follower pulse counter, the present circuit employs the inductance element 124. This markedly improves the efficiency of the circuit because the inductance element has a very low resistance and hence the average bias potential of the cathode is substantially zero. If a resistor were employed, a D. C. voltage drop thereacross would buck the effect of a decreasing negative bias developed on the grid of the tube, and would materially reduce the output obtainable with a given input current.

The rectifier 141 in conjunction with rectifier 140 performs the function of discarding the negative pips developed in the output circuit of the tube 121. As shown in Fig. 3, these pips (*144c*—*151c*) vary in amplitude inversely with respect to variations in amplitude of the positive pips (*144b*—*152b*) and would tend to neutralize the latter. It is therefore an essential element of the circuit.

The rectifier 140 is desirable because it prevents the development of negative voltage pips resulting from decay of positive current pips in inductance element 124. Another action of the rectifier 140 is to bypass the negative current pips around the inductance 124 to prevent a positive surge from being formed by the decay of the negative surges which would tend to counteract the action of the desired positive pips across inductance 124.

The biasing battery 130 makes possible the delivery to the output terminals of a direct current varying strictly in accordance with the frequency variations received. It has been previously indicated that the lowest frequency employed is 200 cycles per second, and this would represent a zero value of data transmitted. Since a frequency of 200 cycles per second would produce a current in the output circuit of the filter stage 134, there would be no null reading. By providing the biasing battery 130 and the adjustable potentiometer, the output potential applied to the oscillograph can be adjusted to zero when the minimum frequency of 200 cycles per second is applied.

The time constant of the CR circuit consisting of the condenser 123 and the resistor 122 is large compared to the time interval between the pulses applied thereto at the minimum frequency of 200 cycles per second, but it must not be so large as to damp out the most rapid frequency variations that may occur. For the telemetering function described, the circuit must pass a maximum pulse recurrence rate of 50 cycles per second.

The lower channel in Fig. 1 beyond the frequency converting unit **111*a*** is identical with the upper channel, the corresponding elements being represented by blocks bearing the same reference numerals with the suffix *a*. In Fig. 2 the curves C*a* to H*a* are shown as decreasing in frequency instead of increasing. Otherwise they are similar to curves C to H. They would be the same as curves C to H if similar frequency modulations were applied to both the 10 kc. and the 50 kc. carriers in the well.

The output currents of the units 134 and **134*a*** may be applied to two elements of a recording oscillograph.

Although for the purpose of explaining the invention, a particular embodiment thereof has been shown and described, obvious modifications will occur to a person skilled in the art, and I do not desire to be limited to the exact details shown and described.

I claim:

1. Apparatus comprising, in combination with a source of recurrent positive pulses of constant amplitude and width but of variable repetition rate to be detected: a cathode follower tube having an anode, cathode and control grid; a source of anode potential having a positive terminal connected to said anode, and having a negative terminal; an inductance element directly connecting said cathode to said negative terminal; an input condenser connecting said source of positive pulses to said grid, and a grid leak resistor connecting said grid to said negative terminal; the ohmic resistance of said inductance element being so low that the cathode biasing effect thereof is substantially negligible, and said grid is variably negatively biased in accordance with the repetition rate of the said positive pulses applied thereto by the blocking action of said grid leak resistor on the grid current induced by said positive pulses; output filter means and rectifier means connecting said cathode to said filter means for applying to said filter means positive pulses developed at said cathode; said positive pulses supplied by said source being of such magnitude relative to the characteristic of the tube as to saturate the tube.

2. Apparatus according to claim 1 in which said rectifying means comprises a half wave rectifier connected in series relation between said cathode and said filter means.

3. Apparatus according to claim 2 including a second half wave rectifier in shunt to said inductance and so poled as to bypass negative pulses from said cathode or negative pulses generated by the decay of the usable positive pulses.

References Cited in the file of this patent

UNITED STATES PATENTS

| | | |
|---|---|---|
| 1,897,880 | Barkley | Feb. 14, 1933 |
| 2,352,082 | De Rosa | June 20, 1944 |
| 2,362,503 | Scott | Nov. 14, 1944 |
| 2,441,957 | De Rosa | May 25, 1948 |
| 2,441,963 | Gray | May 25, 1948 |
| 2,443,619 | Hopper | June 22, 1948 |
| 2,552,110 | Forster | Sept. 12, 1950 |

OTHER REFERENCES

Cocking: "Modern Detector Circuits" in The Wireless World, August 17, 1939.